(12) United States Patent
Rajib et al.

(10) Patent No.: US 11,021,767 B2
(45) Date of Patent: Jun. 1, 2021

(54) METHOD FOR HEAT TREATING AN IRON-CARBON ALLOY

(71) Applicant: TATA STEEL LIMITED, Jharkhand (IN)

(72) Inventors: Saha Rajib, Jharkhand (IN); Kundu Saurabh, Jharkhand (IN); Chandra Sanjay, Jharkhand (IN)

(73) Assignee: TATA STEEL LIMITED, Jamshedpur (IN)

( * ) Notice: Subject to any disclaimer, the term of this patent is extended or adjusted under 35 U.S.C. 154(b) by 205 days.

(21) Appl. No.: 16/083,096

(22) PCT Filed: Dec. 21, 2016

(86) PCT No.: PCT/IB2016/057869
§ 371 (c)(1),
(2) Date: Sep. 7, 2018

(87) PCT Pub. No.: WO2017/153826
PCT Pub. Date: Sep. 14, 2017

(65) Prior Publication Data
US 2019/0062855 A1    Feb. 28, 2019

(30) Foreign Application Priority Data
Mar. 10, 2016 (IN) .............................. 201631008442

(51) Int. Cl.
*C21D 1/04* (2006.01)
*C21D 10/00* (2006.01)
(Continued)

(52) U.S. Cl.
CPC ................ *C21D 1/04* (2013.01); *C21D 1/42* (2013.01); *C21D 1/78* (2013.01); *C21D 9/46* (2013.01);
(Continued)

(58) Field of Classification Search
None
See application file for complete search history.

(56) References Cited

U.S. PATENT DOCUMENTS 6,749,695 B2 *   6/2004   Martis ................. H01F 1/15308
                                                           148/304
2005/0077289 A1   4/2005   Christofis et al.
(Continued)

FOREIGN PATENT DOCUMENTS

EP         2604706 A1      6/2013
JP       H09324212 A      12/1997
(Continued)

OTHER PUBLICATIONS

International Search Report and Written Opinion of the International Searching Authority issued in PCT/IB2016/057689, dated Feb. 13, 2017; ISA/EPO.

*Primary Examiner* — George Wyszomierski
(74) *Attorney, Agent, or Firm* — Harness, Dickey & Pierce, P.L.C.

(57) ABSTRACT

The present disclosure discloses a method for heat treating an iron-carbon alloy. The method comprises acts of heating the iron-carbon alloy to a first pre-determined temperature at a pre-determined heating rate, holding the iron-carbon alloy at the first pre-determined temperature for a pre-set period of time. The method further comprises acts of cooling the iron-carbon alloy to a second pre-determined temperature at a pre-determined cooling rate and inducing magnetic field on the iron-carbon alloy selectively during at least one of heating and cooling of the iron-carbon alloy. The induction of magnetic field on the iron-carbon alloy results in microstructural changes to improve formation of pearlitic structure in the iron-carbon alloy.

12 Claims, 5 Drawing Sheets

(51) Int. Cl.
*C21D 1/42* (2006.01)
*C21D 1/78* (2006.01)
*C21D 9/46* (2006.01)
 C22C 38/00 (2006.01)
 C22C 38/02 (2006.01)
 C22C 38/04 (2006.01)
 C22C 38/06 (2006.01)

(52) U.S. Cl.
CPC ........ C21D 10/00 (2013.01); *C21D 2211/009* (2013.01); *C21D 2281/00* (2013.01); *C22C 38/001* (2013.01); *C22C 38/02* (2013.01); *C22C 38/04* (2013.01); *C22C 38/06* (2013.01); *Y02P 10/25* (2015.11)

(56) References Cited

U.S. PATENT DOCUMENTS

2013/0014863 A1* 1/2013 Ludtka .................... C21D 1/19
148/565
2017/0298462 A1* 10/2017 Winfree ................... C21D 1/04

FOREIGN PATENT DOCUMENTS

| JP | H10235447 A | 9/1998 |
| WO | WO-2013147155 A1 | 10/2013 |

* cited by examiner

METHOD FOR HEAT TREATING AN IRON-CARBON ALLOY

CROSS REFERENCE TO RELATED APPLICATIONS

This application is a U.S. National Phase Application under 35 U.S.C. 371 of International Application No. PCT/IB2016/057869 filed on Dec. 21, 2016 and published in English as WO 2017/153826 A1 on Sep. 14, 2017. This application claims priority to Indian Patent Application No. 201631008442 filed on Mar. 10, 2016. The entire disclosures of all of the above applications are incorporated herein by reference.

TECHNICAL FIELD

The present disclosure generally relates to a field of material science and metallurgy. Particularly, but not exclusively, the present disclosure relates to a heat treatment method for iron-carbon alloys. Further embodiments of the disclosure disclose a method for heat treating eutectoid steel.

BACKGROUND OF THE DISCLOSURE

Iron based alloys with carbon find a wide range of applications in industries. The applications include, but are not limited to automobile panels, pipes, structures such as bridges and buildings, railway cars, surgical tools, electrical components and numerous other applications. Most of the industrial iron based carbon alloys contain small amount of other alloying elements such as Phosphorous (P), Sulphur (S), Manganese (Mn), Silicon (Si), Chromium (Cr), Magnesium (Mg) etc. Further, iron-carbon alloys are broadly classified into steel and cast iron. These iron-carbon alloys may not possess all the desired properties in the finished product. Therefore, these iron-carbon alloys are subjected to heat treatment for controlling material properties to meet various needs in wide variety of applications.

Generally heat treatment is carried out using techniques including but not limiting to annealing, normalising, hot rolling, quenching, and the like. During heat treatment process, the microstructures of materials or iron-carbon alloys are modified when the material undergoes a sequence of heating and cooling operations. As a result of heat treatment, the iron-carbon alloys undergo phase transformation influencing mechanical properties like strength, ductility, toughness, hardness, drawability etc. The purpose of heat treatment is to increase service life of a product by improving its strength, hardness etc or prepare the material for improved manufacturability.

Further, eutectoid steel is a particular form of the iron-carbon alloy which has a carbon composition less than 2 wt %. Such eutectoid steel in particular, finds its applications in various fields such as in construction, bead and cord of automobiles etc. In eutectoid steel, desirable microstructure is fully pearlite (aggregate of ferrite and cementite). However, conventionally, when eutectoid steel is subjected to heat treatment i.e. when eutectoid steel is heated above austenitization temperature and during cooling from austenite to pearlite, there is an inherent tendency to nucleate pro-eutectoid ferrite along the grain boundaries of austenite. Therefore, the final microstructure obtained after phase transformation of a eutectoid steel product at room temperature will always have certain amount of pro-eutectoid ferrite depending upon processing and material parameters. The presence of pro-eutectoid ferrite along the grain boundaries of the final microstructure of eutectoid steel is considered to be harmful, as it acts as easy crack formation sites in the eutectoid steel. This, leads to premature failure during drawing or torsion applications of the eutectoid steel. Since, eutectoid steels are frequently subjected to drawing and torsion applications in industries, formation of pro-eutectoid ferrite in eutectoid steel is not desired.

Conventionally, several attempts have been made to reduce pro-eutectoid formation in eutectoid steel by various methods and strategies. Such methods and strategies proposed are in view of the fact that pro-eutectoid formation is quite sensitive to factors such as cooling conditions and alloying strategy. In one such conventional methods, certain alloying elements are added during phase transformation of high carbon steel from austenite to pearlite is effective in reducing pro-eutectoid formation. In another such method, steel is subjected to rapid cooling followed by holding at specified temperature range during austenite to pearlite phase transformation. However, these earlier prescribed methods are known to have adverse impact on the mechanical properties of the product. Although pro-eutectoid formation in the steel maybe reduced up to some extent, resulting mechanical properties such as strength, drawability etc may not be as desired.

In light of foregoing discussion, there is a need to develop an improved heat treatment method to reduce pro-eutectoid formation in an iron-carbon alloy.

SUMMARY OF THE DISCLOSURE

One or more shortcomings of the prior art are overcome by method as disclosed and additional advantages are provided through the method as described in the present disclosure.

Additional features and advantages are realized through the techniques of the present disclosure. Other embodiments and aspects of the disclosure are described in detail herein and are considered a part of the claimed disclosure.

In one non-limiting embodiment of the disclosure there is provided a method for heat treating an iron-carbon alloy. The method comprises acts of heating the iron-carbon alloy to a first pre-determined temperature at a pre-determined heating rate, holding the iron-carbon alloy at the first pre-determined temperature for a pre-set period of time. The method further comprises acts of cooling the iron-carbon alloy to a second pre-determined temperature at a pre-determined cooling rate and inducing magnetic field on the iron-carbon alloy selectively during at least one of heating and cooling of the iron-carbon alloy. The induction of magnetic field on the iron-carbon alloy results in microstructural changes to improve formation of pearlitic structure in the iron-carbon alloy.

In an embodiment of the disclosure, the method comprises act of selectively inducing the magnetic field on the iron-carbon alloy during holding of the iron-carbon alloy at the first pre-determined temperature for the pre-set period of time.

In an embodiment of the disclosure, the first predetermined temperature is above austenization temperature of the iron-carbon alloy and the first pre-determined temperature ranges from about 800° C. to about 1000° C.

In an embodiment of the disclosure, the pre-determined heating rate ranges from 0.01° C./second to about 5° C./second.

In an embodiment of the disclosure, the pre-set period of time ranges from about 300 seconds to about 5400 seconds.

In an embodiment of the disclosure, the second predetermined temperature is room temperature.

In an embodiment of the disclosure, the pre-determined cooling rate ranges from about 0.01° C./second to 10° C./second.

In an embodiment of the disclosure, strength of the magnetic field ranges from about 0.1 Tesla to about 5 Tesla.

In an embodiment of the disclosure, the iron-carbon alloy is a eutectoid steel.

In an embodiment of the disclosure, microstructure of the eutectoid steel changes from Face Centered Cubic (FCC) to Body Centered and Orthorhombic lattice during cooling.

In an embodiment of the disclosure, heating and holding of the iron-carbon alloy is carried out in a furnace.

In an embodiment of the disclosure, cooling of the iron-carbon alloy is carried by at least one of furnace cooling, air cooling, water cooling, and oil quenching.

In another non-limiting embodiment of the disclosure, an iron-carbon alloy heat-treated by a method as disclosed above, comprises Carbon (C) at about 0.4 wt % to about 1.2 wt %, Manganese (Mn) at about 0.4 wt % to about 0.85 wt %, Silicon (Si) at about 0.05 wt % to about 0.35 wt %, Sulphur (S) at about 0.01 wt % to about 0.06 wt %, Phosphorus (P) at about 0.02 wt % to about 0.05 wt %, Aluminium at about 0.02 wt % to about 0.06 wt %, Nitrogen (N) at about 0.004 wt % to about 0.009 wt %, the balance being iron (Fe) optionally along with incidental elements of the alloy.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

The novel features and characteristics of the disclosure are set forth in the appended description. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which.

Figure 1:
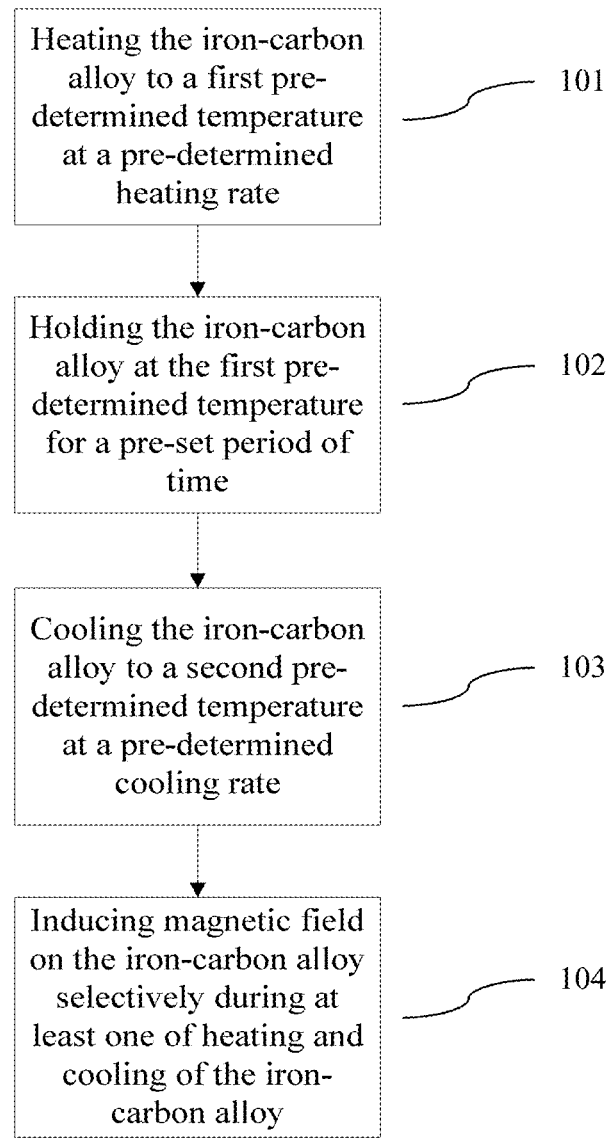
FIG. 1 illustrates a flowchart depicting a method for heat treating an iron-carbon alloy according to an embodiment of the present disclosure.

The figures depict embodiments of the disclosure for purposes of illustration only. One skilled in the art will readily recognize from the following description that alternative embodiments of the methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the description of the disclosure. It should also be realized by those skilled in the art that such equivalent methods do not depart from the scope of the disclosure. The novel features which are believed to be characteristic of the disclosure, as to method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a method that comprises a list of acts does not include only those acts but may include other acts not expressly listed or inherent to such method. In other words, one or more acts in a method proceeded by "comprises . . . a" does not, without more constraints, preclude the existence of other acts or additional acts in the method.

To overcome one or more limitations stated in the background, the present disclosure discloses a method for heat treating an iron-carbon alloy. The present disclosure provides a method to inhibit the formation of pro-eutectoid ferrite during phase transformation of iron-carbon alloy, such as eutectoid steel. Accordingly, by adopting the method of present disclosure, fully pearlite microstructure of the eutectoid steel could be obtained. In majority of the industrial applications, fully pearlite microstructure is desired since it enhances the mechanical properties of the eutectoid steel. The mechanical properties include but are not limited to strength, drawability, torsion, hardness and toughness. Therefore, the present disclosure proposes a method to reduce the pro-eutectoid ferrite formation along the grain boundaries of austenite during phase transformation of the eutectoid steel from Face Centered Cubic (FCC) austenite to aggregate of Body Centered Cubic (BCC) and Orthorhombic termed as pearlite. The present disclosure reduces the formation of pro-eutectoid ferrite in eutectoid steel without having any adverse effects on the eutectoid steel unlike the conventional methods or strategies where mechanical properties of the steel specimen are known to be adversely affected.

In the heat treatment method of the present disclosure, the iron-carbon alloy is heated in a furnace above a pre-determined temperature at a pre-determined heating rate. In an embodiment of the present disclosure, the iron-carbon alloy is eutectoid steel specimen and the eutectoid steel specimen is heated above austenitization temperature i.e. in the temperature range of about 800° C. to about 1000° C. Further, in an embodiment, the rate at which eutectoid steel specimen is heated is in the range of about 0.01° C./second to about 5° C./second. After the eutectoid steel specimen is heated above the austenitization temperature, the specimen is held at this temperature for a pre-defined period of time. In an embodiment, the time period for which the specimen is held at the austenitization temperature is in the range of about 300 seconds to about 5400 seconds. The eutectoid steel specimen is then cooled to room temperature and during cooling the eutectoid steel undergoes phase transformation from austenite to pearlite. The cooling process is carried out at a pre-determined rate and in an embodiment of the disclosure, the pre-determined cooling rate is about 0.01° C./second to about 10° C./second. During the heat treatment process, the method comprises act of inducing magnetic field. In an embodiment of the present disclosure, the arrangement is such that magnetic field is selectively induced i.e. the eutectoid steel specimen could be subjected to magnetic field whenever necessary as per the desired microstructure during the heat treatment process. In an embodiment of the present disclosure, the magnetic field is induced during heating and cooling steps of the heat treatment method. In another embodiment, the magnetic field is induced on the specimen during holding of eutectoid steel at austenitization temperature. With the application of magnetic field on the eutectoid steel, the eutectoid steel specimen undergoes microstructural changes and thereby improves formation of pearlitic structure by reducing the formation of pro-eutectoid ferrite during phase transformation of specimen form austenite to pearlite. In an embodiment of the present disclosure, a relatively low magnetic field is induced on the eutectoid steel, and the magnetic field ranges from about 0.1 Tesla to about 5 Tesla.

Henceforth, the present disclosure is explained with the help of figures for heat treating an iron-carbon alloy, particularly eutectoid steel. However, such exemplary embodiments should not be construed as limitations of the present disclosure, since the heat treatment method may be used on other metal alloys where such need arises. A person skilled in the art can envisage various such embodiments without deviating from scope of the present disclosure.

FIG. 1 is an exemplary embodiment of the present disclosure which illustrates a flowchart depicting a method for heat treating iron-carbon alloy. The heat treatment method is carried out on a eutectoid steel to improve mechanical properties of the final microstructure obtained after phase transformation of the eutectoid steel from austenite to pearlite. To achieve the required phase transformation of eutectoid steel from austenite to pearlite, heat treatment method such as but not limiting to normalizing or hot working process such as hot rolling could be used. In the present disclosure, mechanical properties of the final microstructure are improved by reducing the formation of pro-eutectoid ferrite during phase transformation of eutectoid steel from austenite to pearlite. The heat treatment method of the present disclosure to reduce pro-eutectoid ferrite formation is now described with reference to the flowchart blocks and is as below—

At block 101, the method comprises an act of heating the iron-carbon alloy. The method is particularly applicable to eutectoid steel but is not limited to eutectoid steel alone as it can be extended to other iron-carbon alloys as well. The iron-carbon alloy is heated in a furnace to a pre-determined temperature at a pre-determined heating rate. In an embodiment, the iron-carbon alloy is heated above austenitization temperature to convert the iron-carbon alloy or steel into austenite. The austenitization temperature is generally set at above 800° C. and hence the pre-determined temperature range to which the iron-carbon alloy is heated is in the range of about 800° C. to about 1000° C. Further, in an embodiment, the pre-determined rate at which the iron-carbon alloy is heated is in the range of about 0.01° C./second to about 5° C./second. As shown in FIG. 1, the heat treatment process includes a step of holding the iron-carbon alloy at first predetermined temperature for a pre-set period of time [shown in step 102] after heating the iron-carbon alloy above austenitization temperature. The iron-carbon alloy is held at the pre-determined temperature i.e. in the range of 800° C. to about 1000° C. in the furnace itself. In an embodiment of the disclosure, the pre-set period of time for which the iron-carbon alloy is held at above austenitization temperature is in the range of about 300 second to about 5400 seconds.

At block 103, the heat treatment method of iron-carbon alloy comprises an act of cooling the iron-carbon alloy. The iron-carbon alloy is cooled to a pre-determined temperature at a pre-determined cooling rate. In an embodiment of the disclosure, the pre-determined temperature to which the iron-carbon alloy is cooled is room temperature. The pre-determined cooling rate is in the range of about 0.01°

C./second to about 10° C./second. In an embodiment of the disclosure, the cooling of iron-carbon alloy or the eutectoid steel can be carried out by at least one of furnace cooling, air cooling, water cooling and oil quenching. During cooling, the iron-carbon alloy or the eutectoid steel undergoes phase transformation from austenite to pearlite. Pearlite is an aggregate of ferrite and cementite. Further, cooling stage marks the end of heat treatment method and is a stage where final microstructure is obtained. Also, during cooling of the eutectoid steel, the lattice structure of the eutectoid steel changes from Face Centered Cubic (FCC) to Body Centered Orthorhombic.

At block 104, the method comprises an act of inducing magnetic field on the iron-carbon alloy during at least one of heating and cooling of the iron-carbon alloy. In the present disclosure, the setup is such that the magnetic field could be selectively induced on the iron-carbon alloy at any point of time during the entire heat treatment process i.e. the magnetic field may be switched on and off as per requirements. In an embodiment of the disclosure, the magnetic field is selectively induced on the iron-carbon alloy during holding of iron-carbon alloy at above austenitization temperature. Further, in an embodiment of the disclosure, the magnetic field induced is of relatively low strength and is in the range of about 0.1 Tesla to 5 Tesla. In another embodiment, the direction of induction of magnetic field may be varied as per the requirements.

With the induction of magnetic field on the iron-carbon alloy, the free energy system of the iron-carbon alloy changes and as a result of it, parameters such as but not limited to phase boundaries, critical temperature, critical composition points of the iron-carbon alloy gets altered. This phenomenon brings about microstructural changes in the iron-carbon alloy and hence the final microstructure obtained after the cooling stage i.e. after phase transformation from austenite to pearlite, it is possible to obtain an improved pearlitic microstructure by simultaneously inhibiting the formation of pro-eutectoid ferrite. Hence, the final microstructure with lesser amount of pro-eutectoid ferrite exhibits improved mechanical properties such as but not limited to strength, hardness, toughness, drawability and torsion. With these improved characteristics, the final product could then be used in a wide range of industrial applications.

In an embodiment of the present disclosure, an iron-carbon alloy heat treated by the method of present disclosure comprises Carbon (C) at about 0.4 wt % to about 1.2 wt %, Manganese (Mn) at about 0.4 wt % to about 0.85 wt %, Silicon (Si) at about 0.05 wt % to about 0.35 wt %, Sulphur (S) at about 0.01 wt % to about 0.06 wt %, Phosphorus (P) at about 0.02 wt % to about 0.05 wt %, Aluminium at about 0.02 wt % to about 0.06 wt %, Nitrogen (N) at about 0.004 wt % to about 0.009 wt % and the balance being Iron (Fe) optionally along with incidental elements of the alloy.

The composition of iron-carbon alloy as disclosed above when heated treated under the influence of magnetic field would exhibit following properties: final microstructure comprising pro-eutectoid ferrite less than 5% and hence pearlite greater than 95%, pearlite with spacing in the order of 250-300 nanometer, Vickers hardness (HV) of about 280-300, yield strength of about 450-475 Mega Pascal, tensile strength of about 840-900 Mega Pascal.

Example

Further embodiments of the present disclosure will be described with an example of a particular composition of the iron-carbon alloy. In an embodiment, the iron-carbon alloy is a eutectoid steel. Experiments have been carried out for a specific composition of the eutectoid steel with and without the induction of magnetic field and results have been compared on various fronts to show the contribution of magnetic field in improvement of mechanical properties of the eutectoid steel. The composition of the iron-carbon alloy for which the tests are carried out is as shown in below table.

TABLE 1

| Carbon (C) [%] | Manganese (Mn) [%] | Silicon (Si) [%] | Phosphorous (P) [%] | Sulphur (S) [%] | Nitrogen (N) [%] |
|---|---|---|---|---|---|
| 0.64-0.80 | 0.56-0.80 | 0.10-0.40 | 0.02-0.05 | 0.03-0.06 | 0.004-0.009 |

In an embodiment of the present disclosure, various experiments were carried out on the eutectoid steel specimen for composition as mentioned in Table-1 in conventional heat treatment method and as per heat treatment method of the present disclosure. After conduction of experiments, test results have been compared. In subsequent paragraphs of the disclosure, the method of carrying out the experiment and test results in conjunction with the figures is disclosed.

Figure 2A:
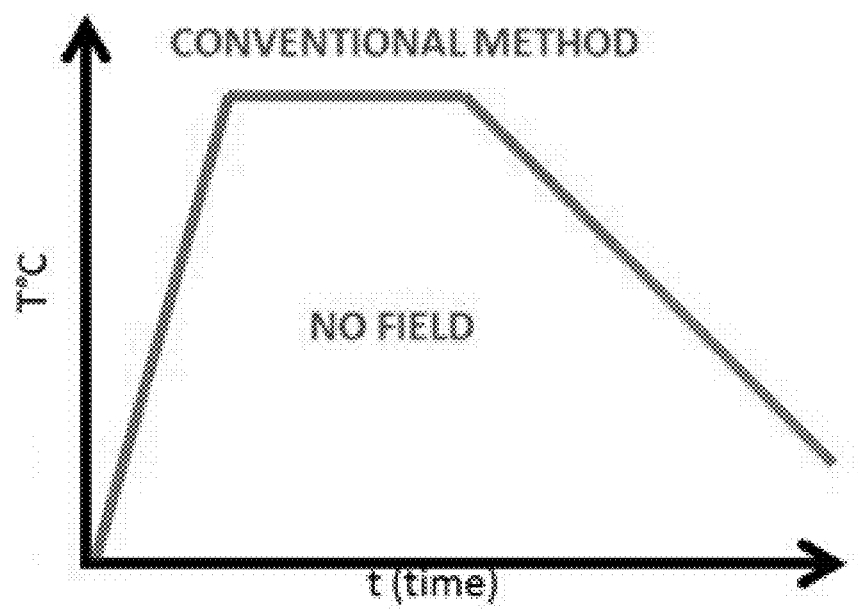
FIG. 2A illustrates graphical representation of a conventional heat treatment method without any application of magnetic field on the iron-carbon alloy.
Figure 2B:
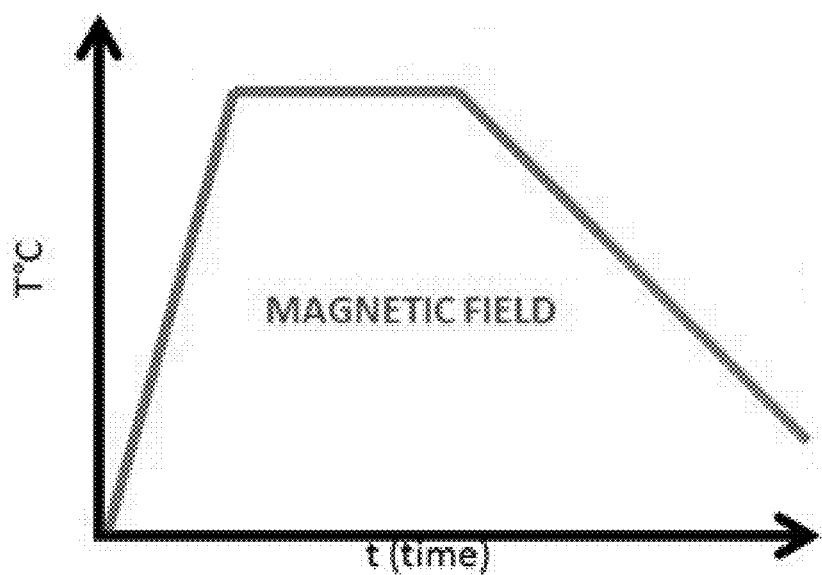
FIG. 2B illustrates graphical representation of heat treatment method of the present disclosure under the influence of magnetic field, according to an exemplary embodiment of the present disclosure.

FIGS. 2A and 2B are exemplary embodiments of the present disclosure, which illustrates graphical representation of the heat treatment method carried out in a conventional manner and by the heat treatment method of the present disclosure respectively. In both the cases i.e. heat treatment method in conventional manner and heat treatment method of the present disclosure, same composition of eutectoid steel were used as mentioned above in Table-1 for the purpose of experiment.

In conventional heat treatment method, a eutectoid steel specimen placed in a crucible is heated in a furnace above austenitization temperature to about 800° C. and 1000° C. at a uniform heating rate. The heating rate in the experiment was in the range of about 0.01° C./second to about 5° C./second. The eutectoid steel specimen was then held at this austenitization temperature for a brief period of time i.e. in the range of about 300 seconds to about 5400 seconds. The eutectoid steel specimen is then cooled at a uniform cooling rate to room temperature. During cooling, the eutectoid steel undergoes phase transformation from austenite to pearlite.

In the heat treatment method of the present disclosure, the eutectoid steel specimen of same composition is subjected to similar heating, holding and cooling conditions as the conventional heat treatment method. However, in the present disclosure, a magnetic field setup is integrated and the magnetic field could be selectively induced on the eutectoid steel. The magnetic field can be switched on and off according to the need and the magnetic field is induced during at least one of heating and cooling of the eutectoid steel. The magnetic field may be induced on the eutectoid steel during holding stage of the heat treatment as well. In this way, the experiments were carried out with and without magnetic field to observe the phase transformation and microstructural changes. Further, in the present disclosure, any conventional method for inducing magnetic field on the eutectoid steel may be used.

Figure 3:
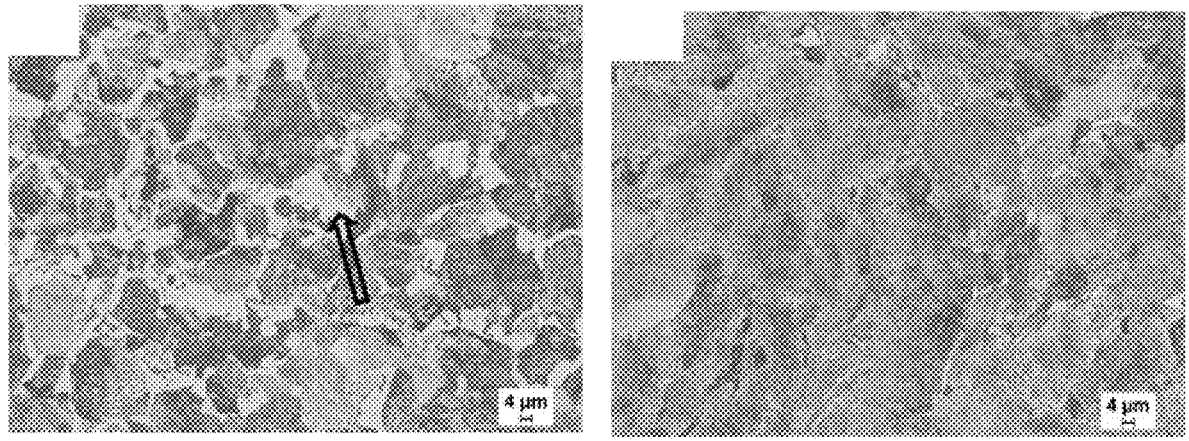
FIG. 3 illustrates optical micrograph of the steel in a conventional heat treatment method and optical micrograph of the steel when heat treated using method of FIG. 1, according to an exemplary embodiment of the present disclosure.

FIG. 3 is an exemplary embodiment of the disclosure which illustrates optical micrograph of the eutectoid steel in the conventional heat treatment method against optical micrograph of the eutectoid steel when heat treated as per present disclosure, according to an exemplary embodiment of the present disclosure. The optical micrograph of the eutectoid steel specimen processed by conventional heat treatment method shows presence of pearlite (aggregate of cementite and ferrite) with good amount of pro-eutectoid ferrite, the pro-eutectoid ferrite is in the range of 12%-25%. The presence of pro-eutectoid ferrite in the eutectoid steel when processed by conventional heat treatment method can be clearly seen and is pointed using an arrow mark. On the other hand, the eutectoid steel when processed by heat treatment method of the present disclosure by inducing magnetic field, the amount of pro-eutectoid ferrite reduces substantially. In an embodiment, the amount of pro-eutectoid ferrite is less than 5% when compared to the conventional method. It can also be seen from FIG. 3 that there is very little formation of pro-eutectoid ferrite along the grain boundaries of the microstructure when the eutectoid steel is processed as per present disclosure. Whereas, when eutectoid steel is processed by conventional heat treatment method, there is large amount of pro-eutectoid ferrite along the grain boundaries of the microstructure.

Figure 4:
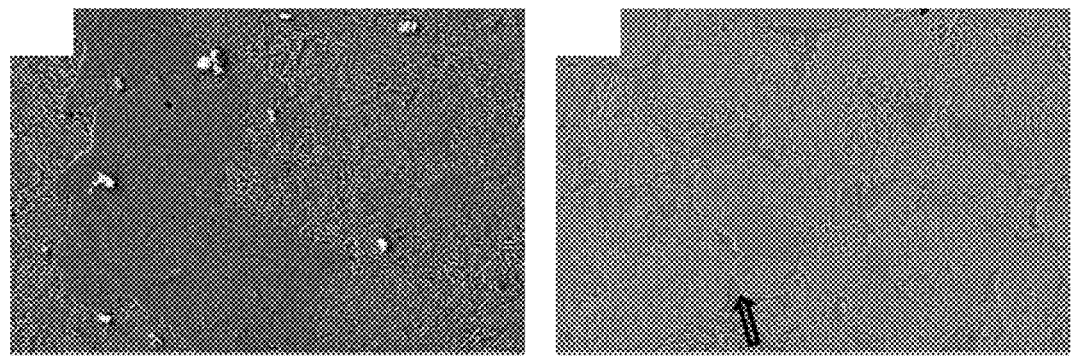
FIG. 4 illustrates Scanning Electron Microscope (SEM) micrograph of the steel in a conventional heat treatment method and Scanning Electron Microscope (SEM) micrograph of the steel when heat treated using method of FIG. 1 according to an exemplary embodiment of the present disclosure.

Referring now to FIG. 4, which is an exemplary embodiment of the present disclosure, illustrates Scanning Electron Microscope (SEM) micrograph of the eutectoid steel in a conventional heat treatment method against Scanning Electron Microscope (SEM) micrograph of the eutectoid steel when heat treated as per present disclosure. The SEM micrograph results of the microstructures further verify the results as obtained in the optical micrograph and show that there is large amount of pro-eutectoid ferrite in the microstructure of eutectoid steel when processed by conventional heat treatment method and microstructure of the eutectoid steel obtained when processed as per present disclosure aids fully pearlitic microstructure or negligible amount of pro-eutectoid ferrite.

Figure 5A:
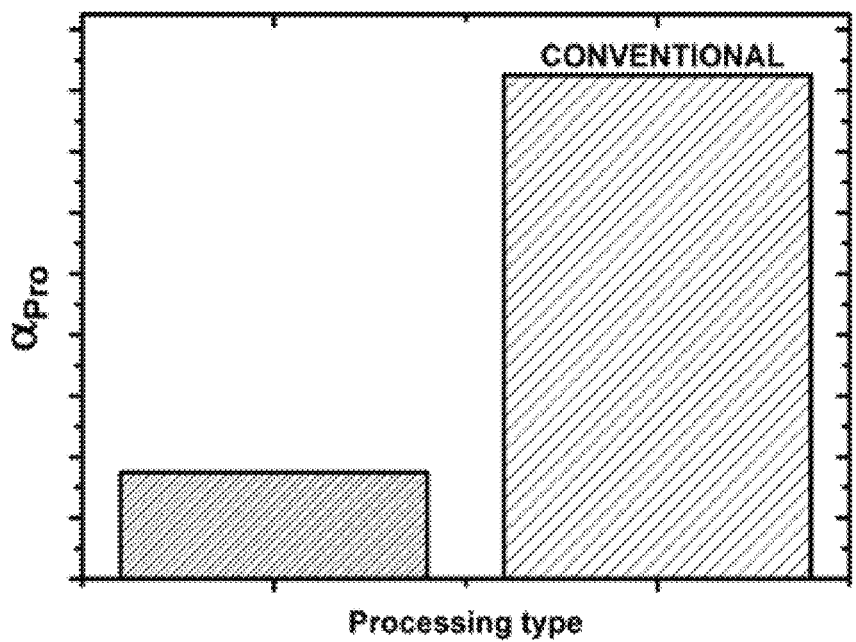
FIG. 5A illustrates a graphical representation of the proportion of pro-eutectoid ferrite in the final microstructure of the steel when processed by heat treatment method of FIG. 1, as against the proportion of pro-eutectoid ferrite of the final microstructure of the steel processed by conventional heat treatment method, according to an exemplary embodiment of the present disclosure.

FIG. 5A is an exemplary embodiment of the present disclosure, which shows proportion of pro-eutectoid ferrite in both the microstructures of the eutectoid steel i.e. when processed by conventional heat treatment method and when processed by a heat treatment method of the present disclosure. The bar graph clearly shows that when magnetic field is used during heat treatment of eutectoid steel, the formation of pro-eutectoid ferrite substantially reduces. Since, the pro-eutectoid ferrite is known to initiate crack in the microstructure, the reduction of pro-eutectoid ferrite and simultaneous increase in pearlite as achieved in the present disclosure will have significant impact on mechanical properties of the eutectoid steel. The mechanical properties like strength, drawability and torsional behavior of the eutectoid steel are known to improve.

Figure 5B:
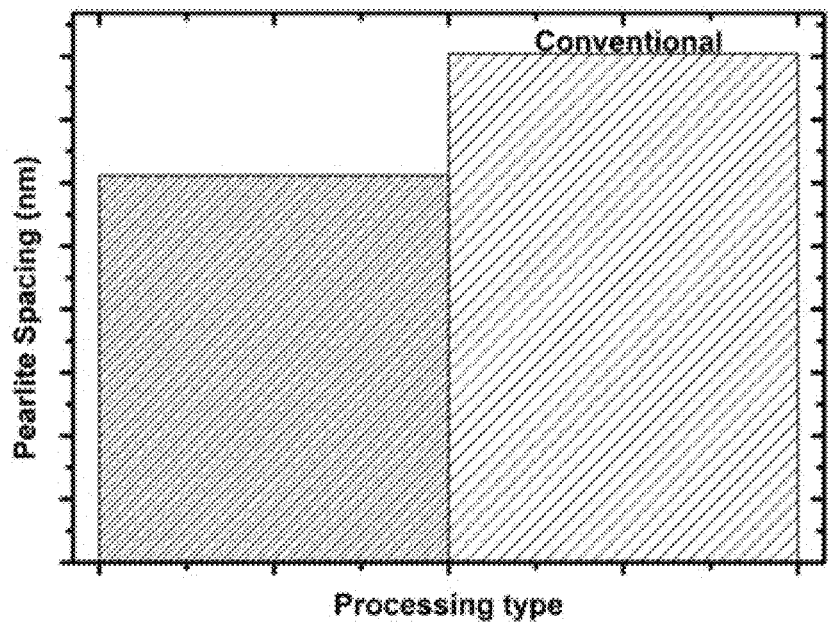
FIG. 5B illustrates a graphical representation of pearlite spacing in the final microstructure of the steel when processed by heat treatment method of FIG. 1, as against the pearlite spacing of the final microstructure of the steel processed by conventional heat treatment method, according to an exemplary embodiment of the present disclosure.

Further, as shown in bar graph of FIG. 5B, the final microstructure obtained under the influence of magnetic field will have lesser pearlite spacing. Pearlite spacing is calculated using several micrographs. The pearlite spacing is directly dependent on the overall toughness of the eutectoid steel, lesser the pearlite spacing better is the toughness of the eutectoid steel. The pearlite spacing when eutectoid steel is processed under magnetic field is finer in comparison with the pearlite spacing when eutectoid steel is processed conventionally without magnetic field. In an embodiment of the present disclosure, pearlite spacing is in the order of about 250-300 nanometer.

Figure 6A:
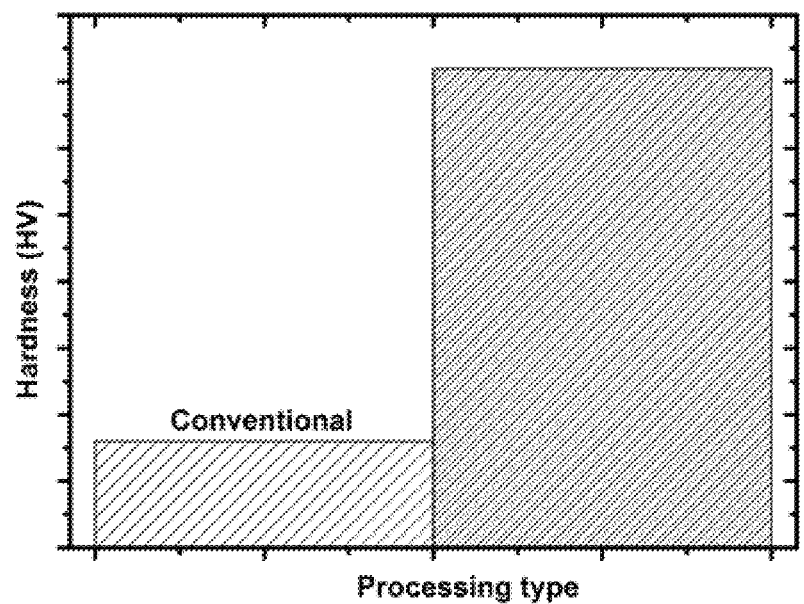
FIG. 6A illustrates a graphical representation of the hardness of final microstructure of the steel when processed by conventional heat treatment method as against the hardness of final microstructure of the steel processed by heat treatment method of FIG. 1, according to an exemplary embodiment of the present disclosure.
Figure 6B:
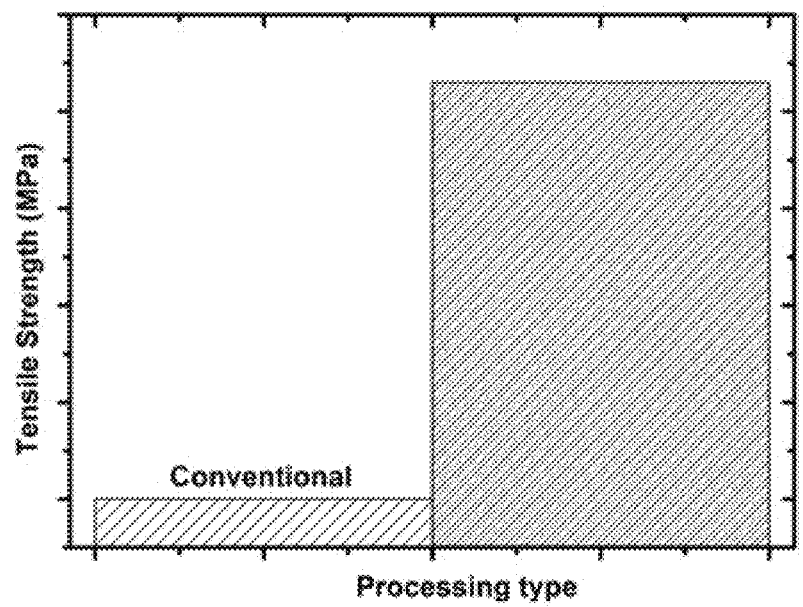
FIG. 6B illustrates a graphical representation of the tensile strength of final microstructure of the steel when processed by conventional heat treatment method as against the tensile strength of final microstructure of the steel processed by heat treatment method of method of FIG. 1, according to an exemplary embodiment of the present disclosure.

As explained in the aforementioned paragraphs, microstructure of the eutectoid steel is known to exhibit better mechanical properties when processed under the influence of magnetic field. To further verify this, hardness measurements were carried out at various parts of the eutectoid steel specimen and average hardness value was calculated for both the processing methods i.e. with and without magnetic field. As shown in FIG. 6A, hardness of the eutectoid steel specimen considerably improves when magnetic field is induced on the specimen. In an embodiment of the present disclosure, hardness value of the eutectoid steel specimen when processed by inducing magnetic field is in the order of about 280-300 Vickers hardness (HV). Similarly one other mechanical property that was considered is strength, and as shown in FIG. 6B, tensile strength of the eutectoid steel specimen when processed by inducting the magnetic field as in the present disclosure is significantly higher in comparison with the eutectoid steel specimen processed by conventional method without magnetic field. In an embodiment of the present disclosure, yield strength of the eutectoid steel specimen is 450-475 Mega Pascal (MPa) and the tensile strength of the present disclosure when eutectoid steel specimen is induced by magnetic field is 840-900 Mega Pascal (MPa).

It should be understood that the experiments are carried out for a particular composition of the iron-carbon alloy and the results brought out in the previous paragraphs are for the composition shown in Table-1. However, this composition should not be construed as a limitation to the present disclosure as it could be extended to other compositions of iron-alloys as well.

Further, in the above paragraphs iron-carbon alloys is interchangeably used with eutectoid steel or steel as the present disclosure is particularly meant for eutectoid steels, however such usage should not be considered as a limitation of the present disclosure.

Advantages

The present disclosure discloses a heat treatment method for iron-carbon alloy to reduce the pro-eutectoid ferrite formation by simultaneously improving the formation of amount of pearlite in the iron-carbon alloy and also reduce the pearlite spacing. With the reduction of pro-eutectoid ferrite formation, the microstructure of the iron-carbon alloys exhibit better mechanical properties such as but not limited to drawability, torsional behaviour, strength, hardness and toughness.

The present disclosure discloses a heat treatment method to improve mechanical properties of the iron-carbon alloy. The mechanical properties of the iron-carbon alloy improve without any change in the basic composition of the iron-carbon alloy.

Equivalents

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Referral Numerals | Description |
| --- | --- |
| 101-104 | Flowchart blocks |
| 101 | Heating stage |
| 102 | Holding stage |
| 103 | Cooling stage |

The invention claimed is:

1. A method for heat treating an iron-carbon alloy, the method comprising acts of:
heating, the iron-carbon alloy to a first pre-determined temperature at a pre-determined heating rate;
holding, the iron-carbon alloy at the first pre-determined temperature for a pre-set period of time;
cooling, the iron-carbon alloy to a second pre-determined temperature at a pre-determined cooling rate; wherein the pre-determined cooling rate ranges from about 0.01° C./second to 10° C./second; and
inducing, magnetic field on the iron-carbon alloy during the heating and the cooling of the iron-carbon alloy, to form of pearlitic structure, wherein the final microstructure of the resulting iron-carbon alloy includes less than 5% pro-eutectoid ferrite.

2. The method as claimed in claim 1 comprising act of selectively inducing the magnetic field on the iron-carbon alloy during holding of the iron-carbon alloy at the first pre-determined temperature for the pre-set period of time.

3. The method as claimed in claim 1, wherein the first predetermined temperature is above austenization temperature of the iron-carbon alloy.

4. The method as claimed in claim 1, wherein the first pre-determined temperature ranges from about 800° C. to about 1000° C.

5. The method as claimed in claim 1, wherein the pre-determined heating rate ranges from 0.01° C./second to about 5° C./second.

6. The method as claimed in claim 1, wherein the pre-set period of time ranges from about 300 seconds to about 5400 seconds.

7. The method as claimed in claim 1, wherein the second pre-determined temperature is room temperature.

8. The method as claimed in claim 1, wherein strength of the magnetic field ranges from about 0.1 Tesla to about 5 Tesla.

9. The method as claimed in claim 1, wherein the iron-carbon alloy is a eutectoid steel.

10. The method as claimed in claim 9, wherein microstructure of the eutectoid steel changes from Face Centered Cubic (FCC) to Body Centered and Orthorhombic lattice during cooling.

11. The method as claimed in claim 1, wherein the heating and holding of the iron-carbon alloy is carried out in a furnace.

12. The method as claimed in claim 1, wherein the cooling of the iron-carbon alloy is carried out by at least one of furnace cooling, air cooling, water cooling, and oil quenching.

* * * * *